United States Patent
Ratcliff et al.

[11] 3,866,861
[45] Feb. 18, 1975

[54] FIRE-SAFE AIRCRAFT REFUSE DISPOSAL SYSTEM

[75] Inventors: Ronald R. Ratcliff; John F. Watts; Alden D. Simonson, all of Bellevue, Wash.

[73] Assignee: The Boeing Company, Seattle, Wash.

[22] Filed: Apr. 22, 1974

[21] Appl. No.: 462,719

[52] U.S. Cl............. 244/118 P, 220/1 T, 232/43.2, 244/163
[51] Int. Cl............................................. B64d 11/00
[58] Field of Search......... 244/118 R, 118 P, 117 R, 244/119, 1 R, 163, 137 R; 105/323, 325, 327; 296/24 R, 24 A; 214/83.18, 832; 232/43.2; 220/1 T, 1 V; 4/8

[56] References Cited
UNITED STATES PATENTS

| | | | |
|---|---|---|---|
| 1,688,271 | 10/1928 | Finch | 232/43.2 |
| 3,517,899 | 6/1970 | Vernon | 244/118 R |
| 3,694,023 | 9/1972 | Burgess | 296/24 R |

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

The aircraft fuselage is equipped with a passenger deck having a hold therebelow for a refuse container, and a chute therein through which the refuse is fed to the container. The hold has spaced surfaces between which the container is removably inserted in use, and the chute opens into the hold at the top surface. The chute has a gasket thereon which is raised relatively into the space between the surfaces about the opening of the chute. The gasket is displaceable in relation to the top surface when the container is inserted into and removed from the space. Also, there is a yieldable biasing ring which is responsive to displacement of the gasket toward the top surface to clamp the container between the gasket and the bottom surface of the hold so that the gasket forms a compression seal between the container and the top surface of the hold, to the effect that the refuse in the chute is fed to the container through a passage which is closed to the hold. In addition, the arrangement also includes a lock for assuring that the chute can be used only when the container is present.

21 Claims, 8 Drawing Figures

3,866,861

FIRE-SAFE AIRCRAFT REFUSE DISPOSAL SYSTEM

THE INVENTION IN GENERAL

Large capacity passenger aircraft have a problem in disposing of refuse, and particularly the refuse left over from meals served to the passengers. Food and drink containers, napkins and utensils are compactly stored prior to the passengers being served, but must be quickly disposed of after the passengers are served, and cannot be carefully stacked. Consequently, the volume required for disposing of all such refuse is much greater than the volume which the refuse occupied prior to use.

It has been proposed that the refuse be deposited in a container in the cargo hold of the aircraft, and that the passenger deck be equipped with a chute for providing access to the container. However, the FAA has rejected this proposal because of the fire hazard, and therefore, until the time of the present invention, the practice had been to continue to store the refuse above the deck, that is, outside of the hold.

The present invention makes it possible to store the refuse in the cargo hold without a fire hazard. It also makes it possible to assure that the refuse will be deposited in the hold only when there are fireproof means to receive it. Furthermore, the invention makes it possible to deposit the refuse in a receptacle which, though fireproof in the hold, is removable from the hold and readily dumpable outside of the aircraft. As indicated, it also makes it possible to assure that no refuse will be added to the hold until the receptacle is returned to the same.

According to the invention, the aircraft fuselage is equipped with a passenger deck having a hold therebelow for a refuse container, and a chute therein through which the refuse is fed to the container. The hold has spaced surfaces between which the container is removably inserted in use, and the chute opens into the hold at one of the surfaces. The one surface has a gasket means thereon that is raised relatively into the space between the surfaces about the opening of the chute, and the gasket means is displaceable in relation to the one surface when the container is inserted into and removed from the space. Also there are yieldable biasing means which are responsive to displacement of the gasket means relative toward the one surface, to clamp the container between the gasket means and the other surface of the hold. In this way, the gasket means forms a compression seal between the container and the one surface of the hold, so that the refuse in the chute is fed to the container through a passage which is closed to the hold.

Typically, the container is inserted between the floor and ceiling of the hold, and the chute opens into the hold at the ceiling thereof and has the gasket means depending thereabout.

Also, in the presently preferred embodiments of the invention, the ceiling of the hold has a recess formed therein about the opening of the chute, the biasing means is disposed in the recess, and the gasket means takes the form of an annular shoe which is supported at its inner periphery on the chute and engaged with the ceiling so as to be deflectable into the recess against the bias of the biasing means. Preferably, the chute has bracket means thereon, and the shoe is supported on the bracket means and slidably shiftable in relation to the ceiling crosswise of the chute. Also, the inner periphery of the shoe has a step therein and the bracket means is inserted in the step and adapted to absorb the impact of the shoe when it shifts crosswise of the chute. Moreover, the outer periphery of the shoe is inclined to the ceiling so that the container can slidably engage with the shoe when it assumes the inserted condition thereof.

In the presently preferred embodiments of the invention, the biasing means takes the form of a resiliently compressible sealing ring which is suspended in the recess above the inner periphery of the shoe. The bracket means take the form of a plurality of resiliently deflectable clips which are laterally outstanding on the chute at spaced intervals about the bottom opening thereof.

To assure that the chute can be used only when the container is present, the arrangement also includes manually operable means for opening and closing the chute, means operable to interlock the closure means to the deck when the chute is closed and the gasket means is disposed in the undisplaced condition thereof, and means responsive to displacement of the gasket means to deactuate the interlock means, so that the closure means is operable to open the chute when the container assumes the inserted condition thereof. For example, the interlock means may take the form of latch means that releaseably engages the closure means in the undisplaced condition of the gasket means, and the interlock deactuating means may take the form of an articulated linkage which is responsive to displacement of the gasket means to disengage the latch means from the closure means.

Preferably, the closure means takes the form of a door which is pivotally mounted on the floor of the deck and has keeper means thereon that are releaseably engageable by the latch means in the closed condition of the door.

In its simplest form, the container has an aperture in the top thereof which substantially registers with the opening of the chute when the container assumes the inserted condition thereof. Preferably, the container is adapted and inserted so that there is a clearance between the top of the container and the ceiling of the hold; and the container has a rim on the top thereof which is relatively raised about the aperture and sloped at the outer periphery thereof to slidably engage with the gasket means when the container assumes the inserted condition thereof.

Also, in the presently preferred embodiments of the invention, the container has an insert therein which is spaced apart from the walls of the container and adapted to receive the refuse through the aperture in the top thereof. One of the walls of the container may be removable and the insert may be removable in turn from the container through the opening formed at the site of the one wall. Alternatively or additionally, one of the walls may be removable and the insert may be tiltable to dump through the opening at the site of the one wall.

Preferably, the insert takes the form of an open-topped bin which is trunnioned on a wheeled carriage so that the top thereof can be rotated into one of a plurality of angular positions, there being means on the carriage for releaseably locking the bin in each of its positions. Also, the bin is preferably equipped with means for manually rotating the bin from below the carriage to dump the contents of the bin.

BRIEF DESCRIPTION OF THE DRAWINGS

These features will be better understood by reference to the accompanying drawings wherein one of the presently preferred embodiments of the invention is illustrated.

In the drawings.

DESCRIPTION OF THE PREFERRED EMBODIMENT

Figure 1:
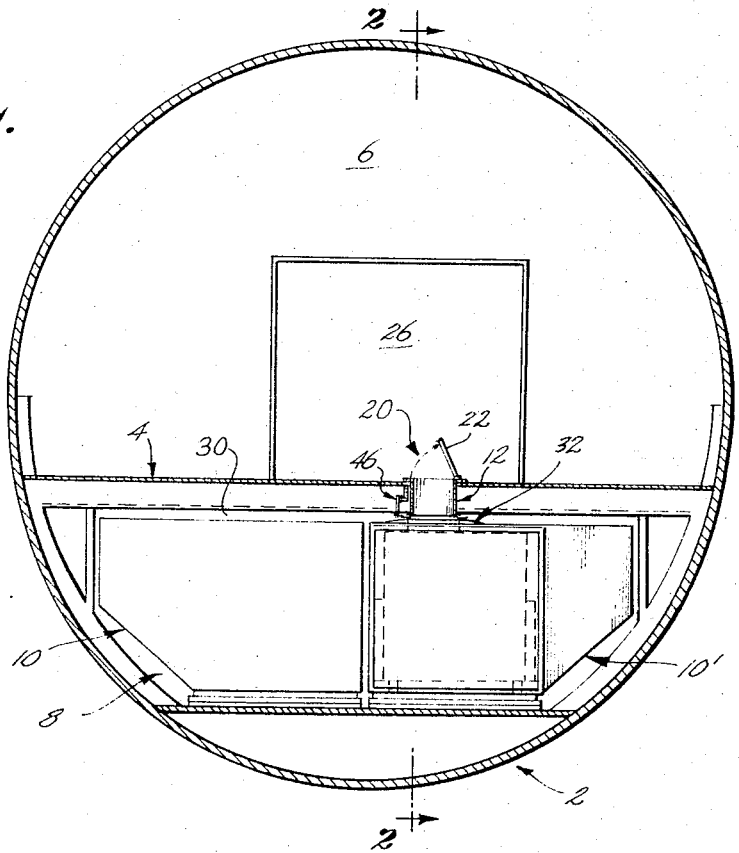
FIG. 1 is a cross section view through the fuselage of the aircraft at the site of the chute.

Referring to the drawings, it will be seen that the fuselage 2 has an interior deck 4 which divides it into upper and lower compartments 6 and 8, the upper 6 of which serves as a seating area for passengers and the lower 8 of which serves as a hold for cargo. The cargo is stored in truncated rectangular containers 10 which are adapted to be inserted in the hold through side openings (not shown) in the fuselage, and then stowed end to end of one another lengthwise of the hold. Typically, each side of the hold is equipped with a series of roller trays and the containers are inserted, aligned and driven into a string that is end-locked to the fuselage and restrained against movement both laterally and vertically thereof. Additionally, the hold may also be equipped with means for fixing one or more containers at selected sites in the hold, without regard to whether other containers are added to form a string. None of these features is specifically illustrated, however, since cargo storage systems of this nature are widely known in the aircraft industry.

Figure 2:
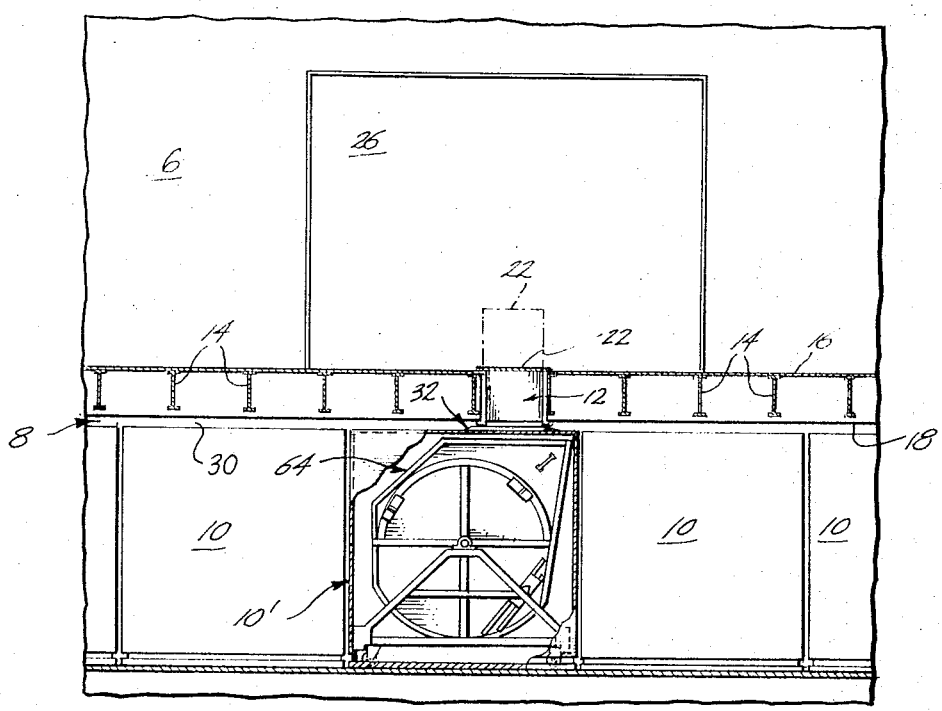
FIG. 2 is a part longitudinal sectional view of the fuselage along the line 2—2 of FIG. 1.

According to the invention, one of the containers is adapted to serve as a receptacle for refuse generated in the seating area 6 during flight. The refuse is fed to the refuse container 10' through a chute 12 formed in the deck 4 between the compartments. As seen in FIG. 2, the deck comprises a series of cross beams 14 which are covered with decking and sheathing to form a floor 16 and ceiling 18 for the respective compartments. The chute 12 is installed in the deck between a pair of the beams and is adapted to open through both the floor and the ceiling. However, the floor opening 12' (FIG. 7) is covered by a hatch 20 comprising a pivotally mounted door 22 which is spring loaded or otherwise biased into the closed position, but equipped with a flush mounted D-ring type grip 24 for opening the door when refuse is to be dumped through the chute. Typically, the hatch 20 is located in the galley 26 of the aircraft where the greatest refuse is generated. Also, it is located directly above one of the container strings so that the refuse container 10' can be positioned under the chute 12 to receive the refuse.

The refuse is received through an aperture 28 in the top of the container 10', and because of the fact that the tops of the container closely approach the underside 18 of the deck, the aperture 28 is disposed immediately below the bottom opening 12" of the chute when the container 10' assumes its position in the hold. On the other hand, the aperture 28 does not mate with the chute, since in order to allow for flexure in the deck, the containers cannot engage the deck and in fact a slight clearance 30 is always provided between the deck and the tops of the containers.

According to the invention, however, the refuse container 10' seals with the underside 18 of the deck around the aperture 28 and the chute 12 so that the refuse in the chute is fed to the container through a closed passage. Referring to FIGS. 1-5 & 7, it will be seen that the aperture 28 has a raised fiberglass or metal rim 32 therearound, and the underside of the deck has a fiberglass or metal shoe 34 suspended therefrom around the bottom opening 12" of the chute in the clearance 30. The rim and shoe are sized to clear the deck and the tops of the containers respectively, but nevertheless to engage one another as the container assumes its position under the chute. Moreover, each has a sloping flank 32' or 34' at the outer periphery thereof, and one of them, in this case the shoe 34, is deflectable, so that as they abut one another, their flanks 32' and 34' overslide one another and enable the container 10' to take up its position below the chute. In this position, the rim 32 substantially registers with the shoe 34, and the shoe forms a gasket-like seal between the container and the deck. It also forms a seal which remains operative even as the container undergoes fore and aft or sidewise movement in the hold. Ordinarily, however, the aperture 28 is larger in area than the bottom opening 12" of the chute so that the chute will register with the aperture regardless of any shift which occurs in the position of the container.

Figure 7:
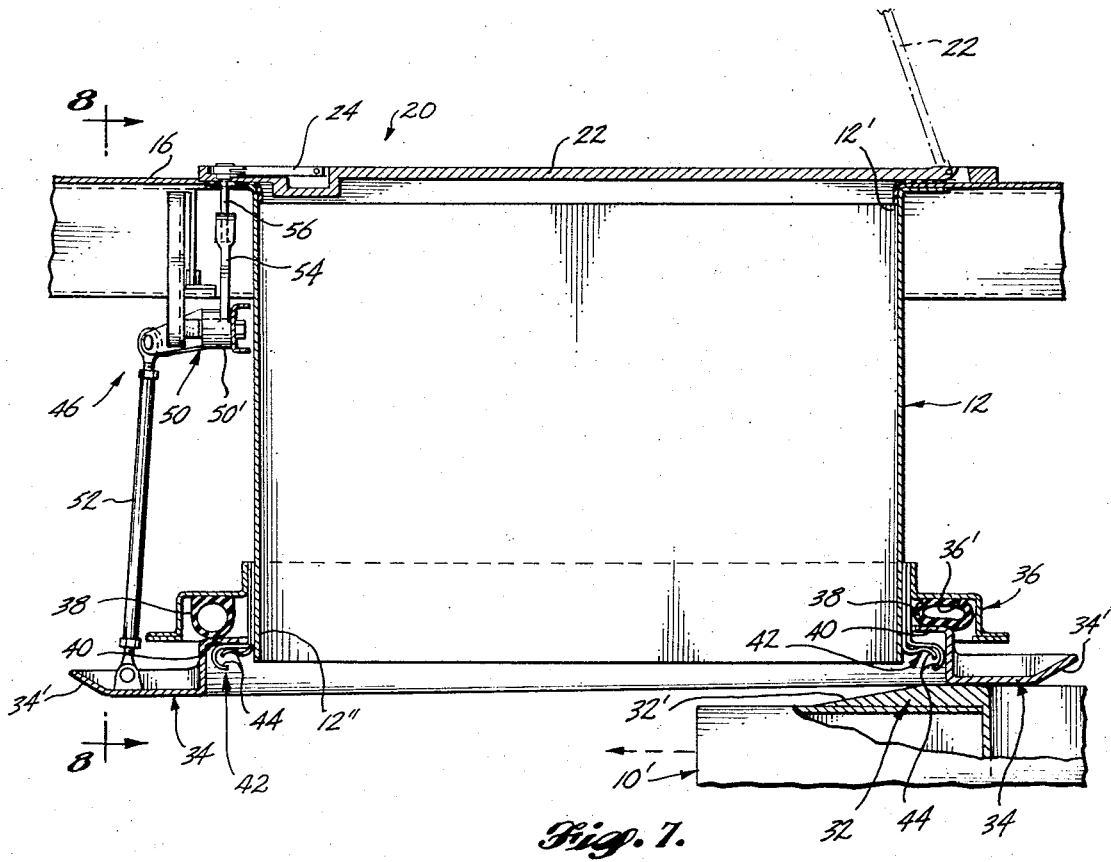
FIG. 7 is an enlarged cross sectional view showing the passenger deck of the chute.
Figure 8:
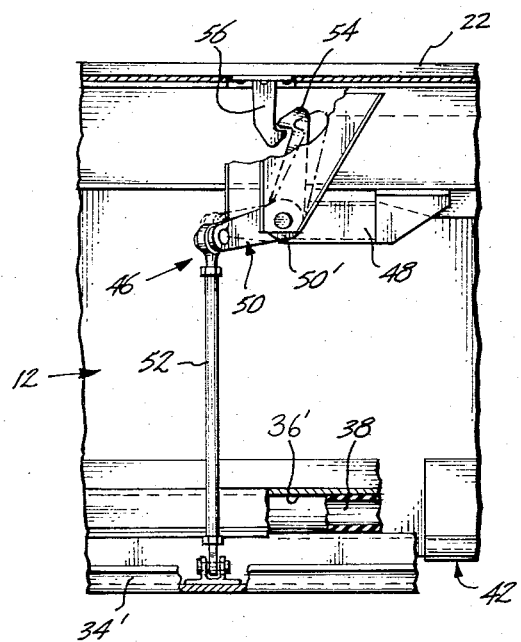
FIG. 8 is an enlarged view in partial section of the deck hatch interlock mechanism.

In order to allow for the necessary deflection and to maintain the integrity of the seal, the shoe 34 is yieldably biased into its normally fully dependent condition. Referring now to FIGS. 7 and 8 in particular, it will be seen that the chute 12 has a peripherally stepped frame 36 around the bottom opening 12" thereof, and the frame is recessed into the ceiling of the hold and has a hollow, resiliently compressible, fiberglass sealing ring 38 bonded to the upper interior face 36' of the same. The inner periphery of the shoe has a step therein, and the lip 40 of the step is upwardly inserted within the frame 36 and supported on a set of metal clips 42 which are disposed at spaced intervals about the bottom of the chute. Each of the clips 42 comprises a pair of nested metal springs 44, and in addition to serving as bracket-like supports for the shoe, they also operate to absorb the impact of the container when it abuts the shoe. Referring specifically to FIG. 7, it will be seen that the shoe is slidably engaged on the chute relative to the ceiling of the hold, and is sized at the inner periphery 40 thereof so that it can shift slidably in relation to the ceiling of the hold crosswise of the chute. Moreover, the springs 44 of the clips are adapted to absorb the impact of the shoe when it is caused to undergo such shift by the impact of the container rim 32 on the flank 34' of the shoe. Simultaneously, the shoe is deflected by the rim as indicated, and as seen in FIG. 7, the deflection is absorbed into the ring 38 so that throughout the time the container remains in the hold, the shoe is under the bias of the ring to maintain a sealed condition with the rim 32,, notwithstanding that relative movement may occur between the shoe and the rim.

Preferably, the clips 42 are adjustably mounted on the chute 12 to make is possible to adjust the position of the shoe 34 when needed.

In order to assure that the door 22 cannot be opened when the container 10' is missing, the deck 4 is also equipped with an interlock device 46 which is actuatable by the bias of the ring 38, that is, by relaxation of the ring to the normally dependent condition of the shoe 34. The deck has a bracket 48 depending therefrom peripherally of the chute, and a crank arm 50 is hub mounted on the bracket to be pivoted up and down in response to the motion of the shoe. The pivotal force is transmitted through an elongated rod-like link 52 which is pivotally interconnected between the end of the arm 50 and the upper side of the shoe 34. The rotation of the arm 50 is transmitted in turn to a dog-like latching hook 54 which is upstanding on the hub 50' of the arm and alternately engageable and disengageable with and from a similar keeper hook 56 depending from the inside face of the door 22.

Figure 6:
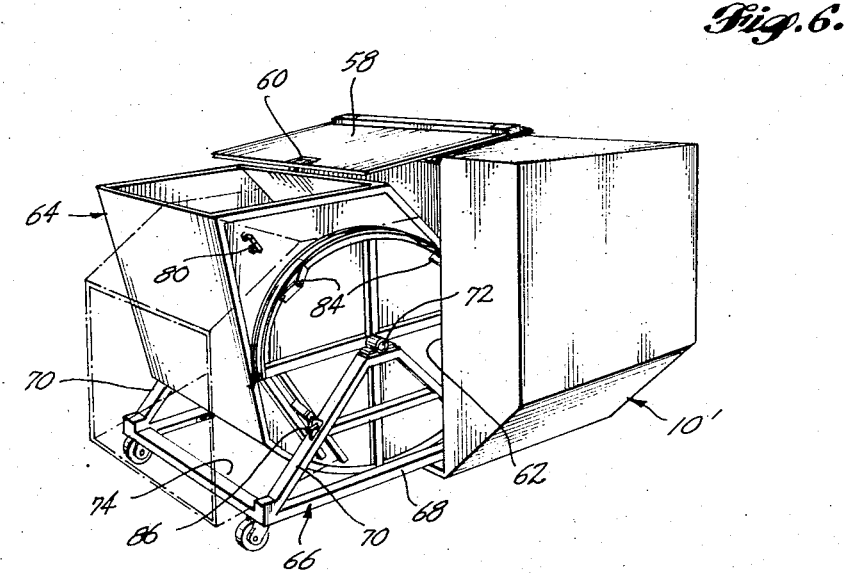
FIG. 6 is a perspective view of the container showing the refuse insert being removed therefrom.

Turning now to the container 10' itself, and to FIGS. 2–6 in particular, it will be seen that the container has a bifold door 58 over one end thereof, and the door 58 is equipped with a handle 60 at the bottom thereof, so that it can be raised and folded back in the manner of FIG. 6 to uncover an opening 62 in the end of the container. Inside of the container 10' and resting on the bottom thereof, is a round-bottomed, open-topped, carriage mounted bin 64 which is adapted to be inserted into and removed from the container 10' after the door 58 is opened, as in FIG. 6. The carriage 66 of the bin comprises a wheeled, open-framed dolly or trundle 68 having a pair of A-frames 70 upstanding on opposing sides thereof. The bin 64 is trunnioned in bearings 72 at the tops of the frames 70, and is truncated across one end, so that after the bin is removed from the container, it can be rotated counterclockwise of FIG. 3 to invert the same for dumping through the opening 74 in the frame 68 of the carriage. Alternatively, and even while it remains in the container, the bin 64 can be rotated clockwise of FIG. 3 to assume the dot-dash position of FIG. 6, wherein it can be unloaded from the side.

Figure 3:
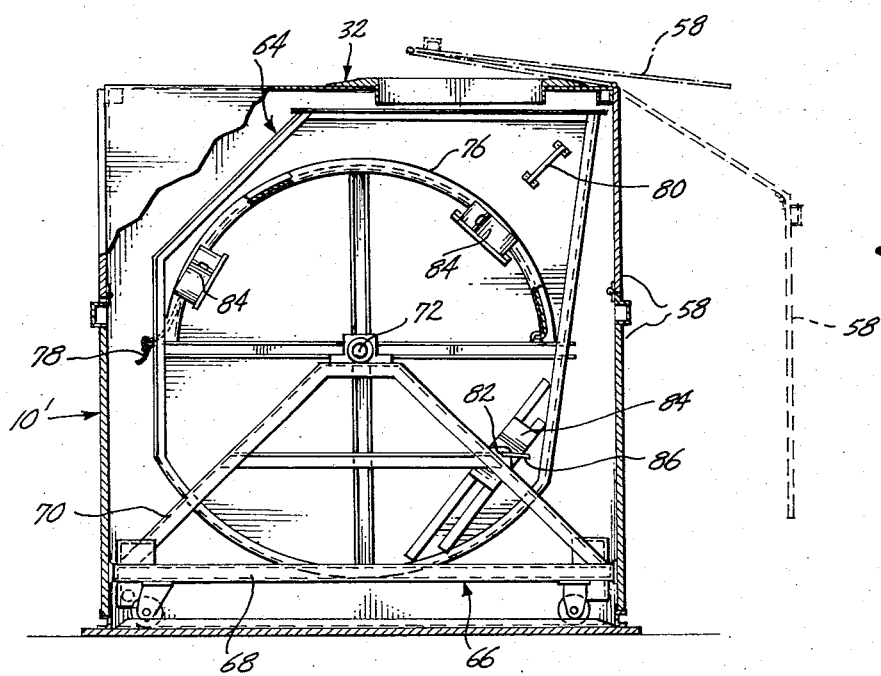
FIG. 3 is a partial sectional view in side elevation of the refuse container, including the refuse insert therein.
Figure 4:
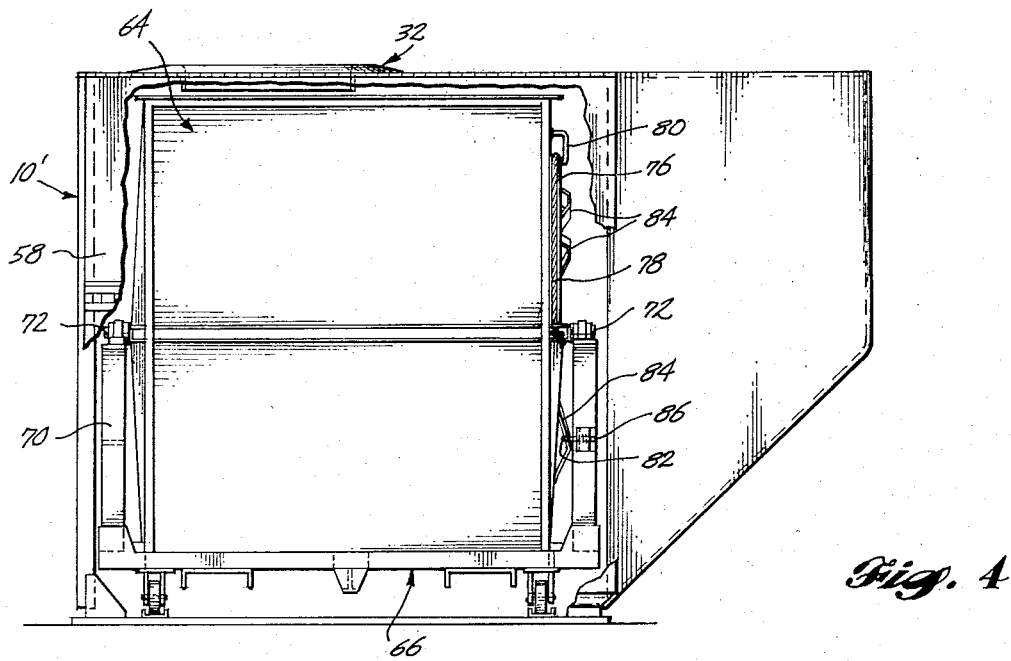
FIG. 4 is a partly removed partially broken away view of the container as seen at right angles to the view of FIG. 3.
Figure 5:
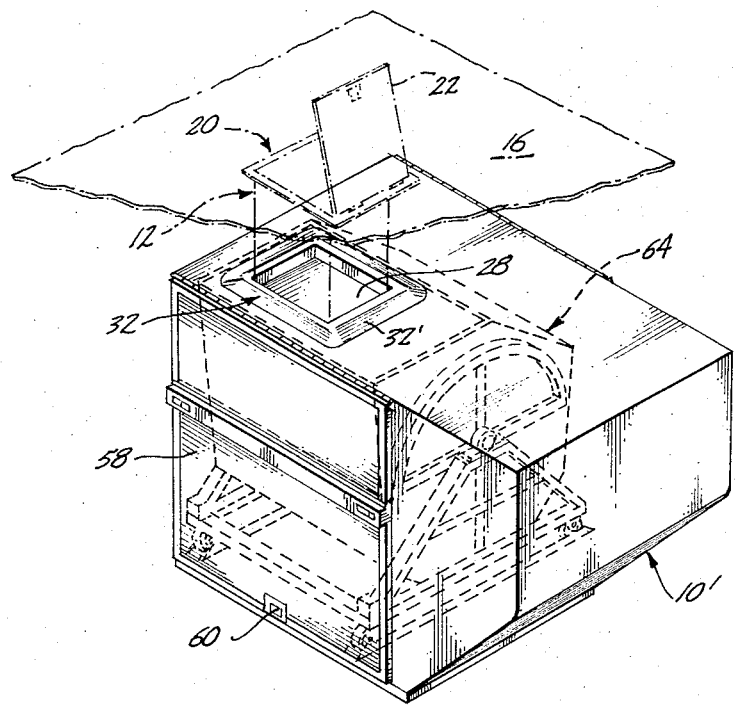
FIG. 5 is a perspective view of the container with the chute shown in ghost outline.

To assist in inverting the bin, there is an arcuate rib 76 on one side of the bin which has a rope 78 channeled therethrough that is anchored at the right hand end of the rib 76 in FIG. 3 and exposed at the left hand end to be grasped for purposes of inverting the bin where desired. The rope 78 is particularly useful when the bin is elevated and dumped into a trash receptacle (not shown), as for example, where it is engaged and raised by a forklift device (not shown) for that purpose. In such a case then, an operator can grasp the rope from below and pull it to invert the bin. Alternatively, where the bin is tipped into the dot-dash condition of FIG. 6, handles 80 are commonly employed to grip the bin. In either mode, the bin may be easily uprighted by rotating it with the handles 80 until it achieves an over-center condition and uprights itself.

Moreover, in each of the three conditions of the bin 64, that is, the upright condition and each of the aforementioned unloading conditions, it is possible to lock the bin against rotation by inserting a spring-loaded pin 82 in one of three tapered embossments 84 formed on the side of the bin at appropriate angular stations for the positions. The pin 82 has a lever-type handle 86 thereon, and the handle is engaged in a notch to deactuate the pin while the bin is rotated.

Preferably the chute 12 and ring 38 are rectangular in horizontal cross section, and the door 22 is also key-locked.

What is claimed is:

1. In an aircraft fuselage, a passenger deck having a hold therebelow for a refuse container and having a chute therein through which the refuse is fed to the container, the hold having spaced surfaces between which the container is removably inserted in use, and the chute opening into the hold at one of the surfaces, the chute having gasket means thereon that is positioned in the space between the surfaces about the opening of the chute, the gasket means being displaceable in relation to the one surface when the container is inserted into and removed from the space, and yieldable biasing means responsive to displacement of the gasket means relatively toward the one surface for clamping the container between the gasket means and the other surface of the hold.

2. The aircraft fuselage according to claim 1 wherein the container is inserted between the floor and ceiling of the hold in use, and the chute opens into the hold at the ceiling thereof and has the gasket means depending thereabout.

3. The aircraft fuselage according to claim 2 wherein a recess is formed about the opening of the chute, the biasing means is disposed in the recess, and the gasket means takes the form of an annular shoe that is supported at its inner periphery on the chute and engaged with the ceiling so as to be deflectable into the recess against the bias of the biasing means.

4. The aircraft fuselage according to claim 3 wherein the chute has bracket means thereon, and the shoe is supported on the bracket means and is slidably shiftable crosswise of the chute.

5. The aircraft fuselage according to claim 4 wherein the inner periphery of the shoe has a step therein and the bracket means are inserted in the step and adapted to absorb the impact of the shoe when it shifts crosswise of the chute.

6. The aircraft fuselage according to claim 5 wherein the outer periphery of the shoe is inclined to the ceiling so that the container can slidably engage with the shoe when it assumes the inserted condition thereof.

7. The aircraft fuselage according to claim 5 wherein the biasing means takes the form of a resiliently compressible sealing ring which is suspended in the recess above the inner periphery of the shoe.

8. The aircraft fuselage according to claim 7 wherein the bracket means takes the form of a plurality of resiliently deflectable clips which are laterally outstanding on the chute at spaced intervals about the bottom opening thereof.

9. The aircraft fuselage according to claim 1 further comprising manually operable means for opening and closing the chute, means operable to interlock the closure means to the deck when the chute is closed and the gasket means is disposed in the undisplaced condition thereof, and means responsive to displacement of the gasket means to deactuate the interlock means so that the closure means is operable to open the chute when the container is inserted in the space between the surfaces.

10. The aircraft fuselage according to claim 9 wherein the interlock means takes the form of latch means which releaseably engages the closure means in the undisplaced condition of the gasket means, and the interlock deactuating means takes the form of an articulated linkage which is responsive to displacement of the gasket means to disengage the latch means from the closure means.

11. The aircraft fuselage according to claim 9 wherein the closure means takes the form of a door that is pivotably mounted on the deck and has keeper means thereon that are releaseably engageable by the latch means in the closed condition of the door to maintain the door in a closed position when the gasket means is disposed in the undisplaced condition.

12. In an aircraft fuselage, a passenger deck having a hold therebelow and a chute therein through which refuse is fed to the hold, said hold having spaced surfaces and said chute opening into the hold at one of the surfaces, said chute having gasket means thereon which are normally raised relatively into the space between the surfaces about the opening of the chute, the gasket means being displaceable in relation to the one surface, biasing means that is yieldable to displacement of the gasket means relatively toward the one surface, and a refuse container removably clamped between the gasket means and the other surface of the hold under the bias of the biasing means.

13. The aircraft fuselage according to claim 12 wherein the chute opens into the hold at the ceiling thereof and has the gasket means depending thereabout, and the container is clamped between the gasket means and the floor of the hold.

14. The aircraft fuselage according to claim 13 wherein the container has an aperture in the top thereof which substantially registers with the opening of the chute.

15. The aircraft fuselage according to claim 14 wherein there is a clearance between the top of the container and the ceiling of the hold, and the container has a rim on the top thereof which is relatively raised about the aperture and sloped at the outer periphery thereof to slidably engage with the gasket means as the container assumes the clamped condition thereof.

16. The aircraft fuselage according to claim 14 wherein the container has an insert therein that is spaced apart from the walls of the container and adapted to receive the refuse through the aperture in the top of the container.

17. The aircraft fuselage according to claim 16 wherein one of the walls of the container is removable and the insert is removable in turn from the container through the opening formed at the site of the one wall.

18. The aircraft fuselage according to claim 16 wherein one of the walls of the container is removable and the insert is tiltable to dump through the opening at the site of the one wall.

19. The aircraft fuselage according to claim 16 wherein the insert takes the form of an open topped bin which is trunnioned on a wheeled carriage so that the top can be rotated into one of a plurality of angular positions, there being means on the carriage for releasably locking the bin in each of its positions.

20. In an aircraft fuselage, a passenger deck having a hold therebelow and a chute therein through which refuse is fed to the hold, said hold having spaced surfaces and said chute opening into the hold at one of the surfaces, a refuse container removably insertable in the space between the surfaces and having an aperture therein that substantially registers with the opening of the chute, gasket means that is operatively interengaged between the container and the one surface about the chute, the gasket means being displaceable in relation to the one surface, and yieldable biasing means that is responsively connected with the gasket means so that the gasket means forms a compression seal between the container and the chute under the bias thereof, to the effect that the refuse in the chute is fed to the container through a passage which is closed to the hold.

21. The aircraft fuselage according to claim 20 wherein the gasket means is connected to the chute to assume a relatively raised condition thereon about the opening of the chute when the container is removed from the space between the surfaces.

* * * * *